(12) United States Patent
Mayfield (10) Patent No.: US 9,268,585 B2
(45) Date of Patent: Feb. 23, 2016

(54) UTILIZING SCRIPTING FOR PROVISIONING ACTIONS

(75) Inventor: Douglas Mayfield, Fremont, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 2765 days.

(21) Appl. No.: 11/807,934

(22) Filed: May 29, 2007

(65) Prior Publication Data

US 2008/0301633 A1 Dec. 4, 2008

(51) Int. Cl.
*G06F 9/44* (2006.01)
*G06F 9/455* (2006.01)

(52) U.S. Cl.
CPC .................... *G06F 9/45512* (2013.01)

(58) Field of Classification Search
CPC .... G06F 9/45512; G06F 9/45508; G06F 8/30
USPC .......................................... 717/115
See application file for complete search history.

(56) References Cited

U.S. PATENT DOCUMENTS

| | | | | |
|---|---|---|---|---|
| 6,801,853 B2* | 10/2004 | Workman | ...... | 701/213 |
| 7,551,704 B2* | 6/2009 | Oda et al. | ...... | 375/377 |
| 7,660,921 B2* | 2/2010 | Schenk | ...... | 710/62 |
| 2004/0117523 A1* | 6/2004 | Witt, Jr. | ...... | 710/100 |
| 2004/0255139 A1* | 12/2004 | Giobbi | ...... | 713/193 |
| 2005/0235086 A1* | 10/2005 | Mills et al. | ...... | 710/301 |
| 2008/0005426 A1* | 1/2008 | Bacastow et al. | ...... | 710/62 |
| 2008/0254835 A1* | 10/2008 | Mellqvist | ...... | 455/559 |
| 2008/0281165 A1* | 11/2008 | Rai et al. | ...... | 600/300 |
| 2008/0294650 A1* | 11/2008 | Karlsson | ...... | 707/100 |
| 2009/0073965 A1* | 3/2009 | Dowling et al. | ...... | 370/352 |
| 2009/0124917 A1* | 5/2009 | Hatlestad et al. | ...... | 600/529 |
| 2009/0265396 A1* | 10/2009 | Ram et al. | ...... | 707/204 |
| 2010/0164700 A1* | 7/2010 | McKethan | ...... | 340/431 |

* cited by examiner

*Primary Examiner* — Anna Deng (57) ABSTRACT

Embodiments in accordance with the present invention recite utilizing scripting for provisioning actions. In one embodiment, a removable data storage device is communicatively coupled with a portable electronic device. An executable script file stored by the removable data storage device is utilized to cause the portable electronic device to perform an action.

18 Claims, 6 Drawing Sheets

UTILIZING SCRIPTING FOR PROVISIONING ACTIONS

FIELD OF THE INVENTION

Embodiments in accordance with the present invention are related to the field of provisioning electronic devices.

BACKGROUND OF THE INVENTION

Currently, there are numerous types of portable electronic devices having a limited communication capability and/or a limited user interface capability. This may be desirable in some instances in order to keep the unit cost of the device to a minimum, or because it is not desired that a casual user is able to interact with the software or firmware running on the device.

As an example, some position tracking and reporting devices which generate an autonomous position report when movement is detected, or when a position request is received from a user or monitoring service. These devices are often used for fleet monitoring, asset tracking and recovery and the like. The position tracking device typically does not have an integrated user interface or display device both because they are not necessary for the normal operation of the device and to keep the unit cost of the device to a minimum.

However, at times it may be desirable to be able to reconfigure the position tracking device, or to retrieve data from it. This typically involves coupling the position tracking device with a laptop computer and manually initiating the desired operation. This can be cumbersome and heavy for the operator performing this, especially when there may be dozens, or hundreds of position tracking devices in use. Some position tracking and reporting devices have wireless communication capability. However, some users, especially those with multiple tracking devices, may find wireless communications too costly, or not secure enough to configure, retrieve data from their position tracking devices in this manner.

SUMMARY OF THE INVENTION

Embodiments in accordance with the present invention recite utilizing scripting for provisioning actions. In one embodiment, a removable data storage device is communicatively coupled with a portable electronic device. An executable script file stored by the removable data storage device is utilized to cause the portable electronic device to perform an action.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

DETAILED DESCRIPTION OF THE PREFERRED EMBODIMENT

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "coupling," "utilizing," "initiating," "recognizing," "locating," "using," "selecting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
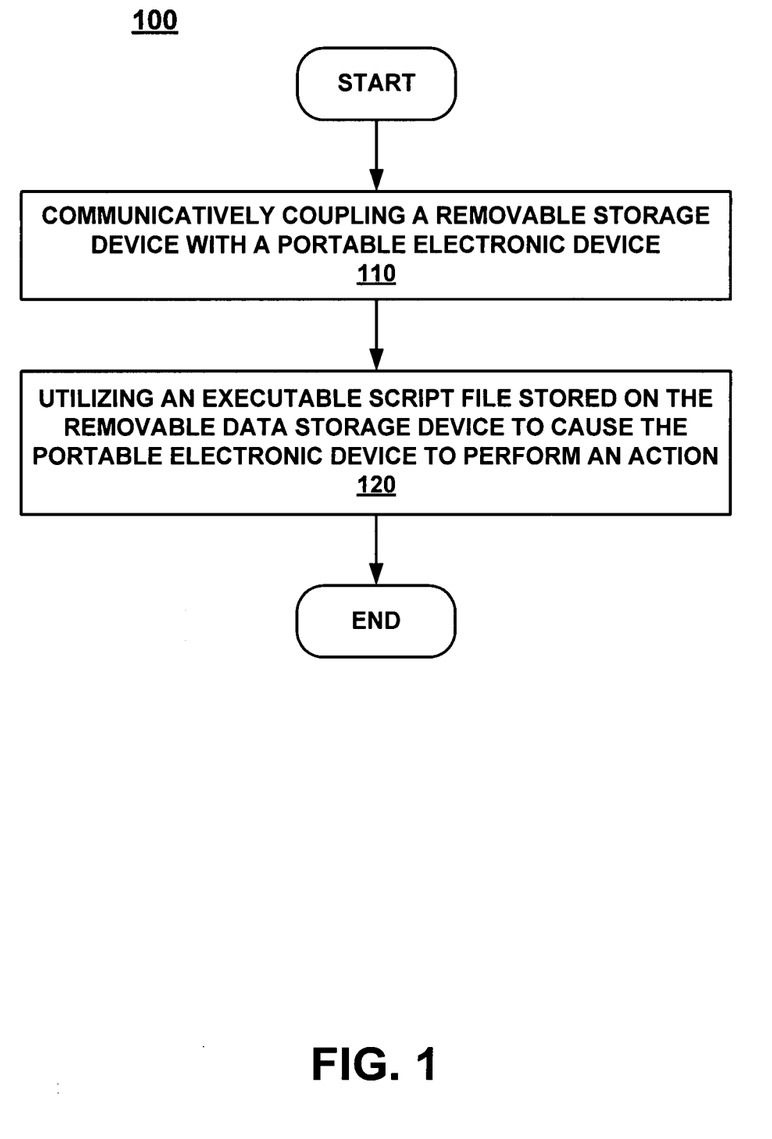
FIG. 1 is a flowchart of a method for provisioning a portable electronic device in accordance with embodiments of the present invention.

FIG. 1 is a flowchart of a method 100 for provisioning a portable electronic device in accordance with embodiments of the present invention. In step 110 of FIG. 1, a removable data storage device is communicatively coupled with a portable electronic device. As will be described in greater detail below, embodiments of the present invention utilize removable data storage devices to convey executable data script files to portable electronic devices.

In step 120 of FIG. 1, an executable script file stored on the removable data storage device is utilized to cause the portable electronic device to perform an action. In embodiments of the present invention, a script file stored on the removable data storage device causes the portable electronic device to initiate an action such as downloading data and/or configuration settings for the portable electronic device. Alternatively, the script file stored on the removable data storage device causes the portable electronic device to initiate uploading data and/or configuration setting onto the removable data storage device.

Embodiments of the present invention are advantageous over some conventional methods used to load or extract data from portable electronic devices. For example, in order to load or extract data from some portable electronic devices, a user couples a laptop computer to the portable electronic device using a communication cable. The user typically navigates the file system of either the laptop computer, or the portable electronic device, to locate the desired file(s). The user then initiates uploading/downloading the data. Many users find carrying the laptop computer and coupling it with the portable electronic device to be cumbersome and time consuming, especially if they are repeating this sequence with dozens, or hundreds, of portable electronic devices. In contrast, embodiments of the present invention utilize a small form factor device which is easily carried and communicatively coupled with the portable electronic device. Additionally, embodiments of the present invention utilize a script file which may cause the portable electronic device to automatically perform the desired action when the removable data storage device is communicatively coupled therewith. As a result, embodiments of the present invention facilitate uploading and/or downloading data with respect to portable electronic devices which may lack the bandwidth to perform these actions, or to perform them in a cost effective manner.

Figure 2:
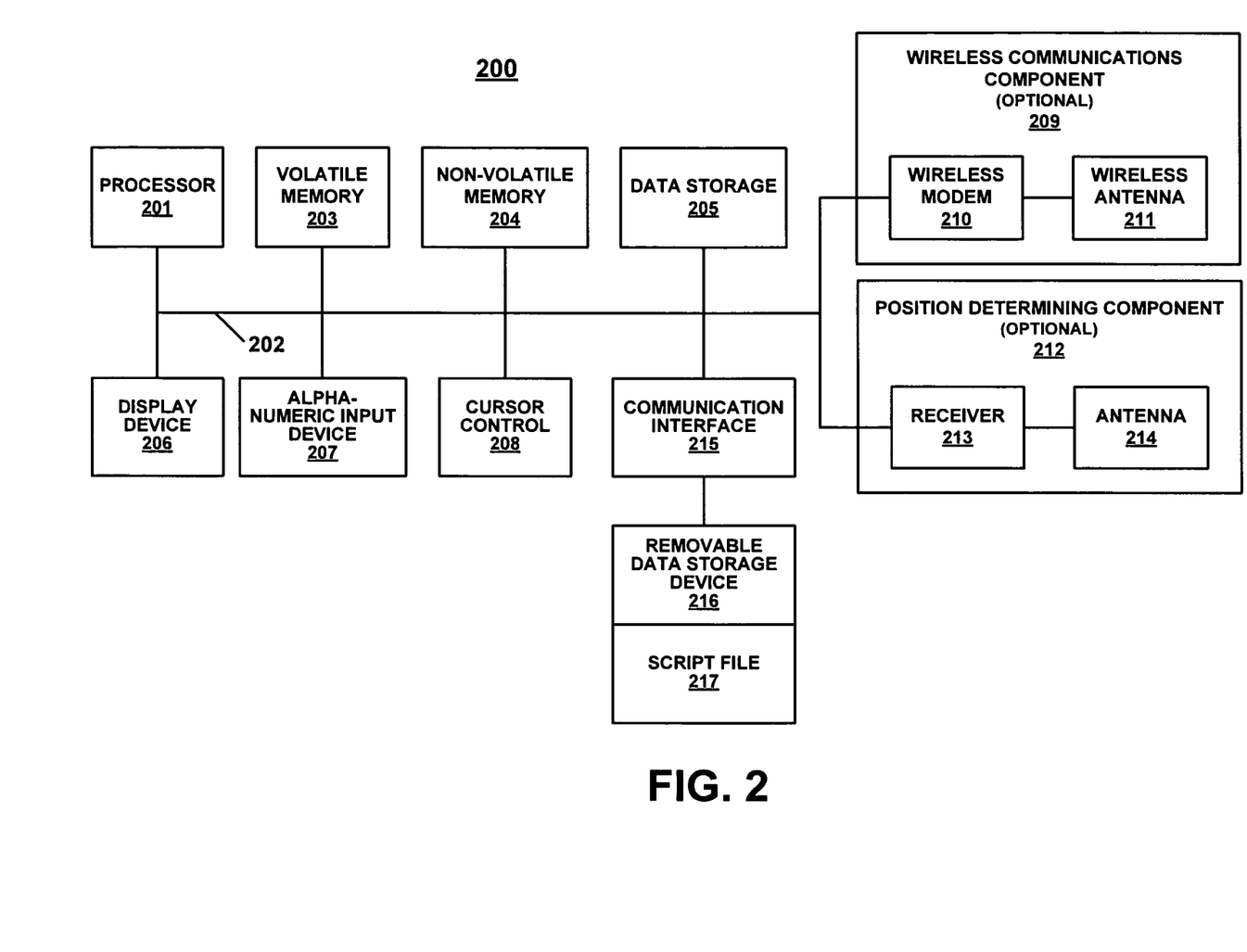
FIG. 2 is a block diagram of a portable electronic device utilized in accordance with embodiments of the present invention.

FIG. 2 is a block diagram of a portable electronic device 200 utilized in accordance with embodiments of the present invention. In FIG. 2, portable electronic device 200 comprises a processor 201 coupled with an address/data bus 202. Processor 201 is for processing digital information and instructions and bus 202 is for conveying digital information between various components of portable electronic device 200. Also coupled with bus 202 is a volatile memory (e.g., RAM) 203 for storing the digital information and instructions of a more volatile nature and a non-volatile memory (e.g., ROM) 204 for storing information and instructions of a more permanent nature. In addition, portable electronic device 200 may optionally include a data storage device 205 for storing vast amounts of data. In embodiments of the present invention, data storage device 205 may comprise a magnetic data storage device, or optical data storage device. It should be noted that instructions for processor 201 can be stored in non-volatile memory 204, volatile memory 203, or data storage device 205.

Returning still to FIG. 2, portable electronic device 200 further comprises a display device 206, an alpha-numeric input device 207 (e.g., a keyboard), and a cursor control device 108 (e.g., mouse, trackball, light pen, etc.) for inputting data, selections, updates, etc. Display device 206 of FIG. 2 may be a liquid crystal device, cathode ray tube, or other display device suitable for creating graphic images and alpha-numeric characters recognizable to a user. Cursor control device 208 allows a user to dynamically signal the two dimensional movement of a visible symbol (cursor) on a display screen of display device 206. Many implementations of cursor control device 208 are known in the art including a trackball, mouse, touch pad, joystick, or special keys on alpha-numeric input 207 capable of signaling movement of a given direction or manner displacement. Alternatively, it will be appreciated that a cursor can be directed and/or activated via input from alpha-numeric input 207 using special keys and key sequence commands. Alternatively, the cursor may be directed and/or activated via input from a number of specially adapted cursor directing devices.

Returning to FIG. 2, portable electronic device 200 further comprises an optional wireless communications component 209, comprising a wireless modem 210 and a wireless antenna 211, coupled with bus 202. An optional GNSS position determining component 212, comprising a GNSS receiver 213 and a GNSS antenna 214, is also coupled with bus 202.

Wireless communications component 209 is for transmitting and receiving wireless messages (e.g., data and/or commands). In one embodiment, wireless communications component 209 comprises a cellular wireless antenna 211 and a cellular wireless modem 210. In one embodiment, portable electronic device 200 sends and receives message using the Short Message Service (SMS). However, portable electronic device 200 is well suited to utilize other message formats as well. Alternatively, wireless communications component 209 may comprise a Bluetooth wireless communications device, or another wireless communications device such as a Wi-Fi transceiver. Wi-Fi transceivers are often used to create local are networks between a portable computer and an Internet access point in public areas such as airports, coffee shops, libraries, and the like.

GNSS position determining system 212 is for determining the location of portable electronic device 200. In FIG. 2, position determining component 212 comprises a GNSS antenna 214 and a GNSS receiver 213. However, portable electronic device 200 is not limited to using a GNSS position determining system alone. For example, position determining component 210 may determine the location of portable electronic device 200 using cellular telephone signals, digital television signals, terrestrial-based navigation systems, etc In FIG. 2, portable electronic device 200 further comprises a communication interface 215 which is coupled with bus 202. In accordance with embodiments of the present invention, a removable data storage device 216 is communicatively coupled with interface 215. Removable data storage device 216 may comprise a removable storage medium such as a Smart Card, Universal Serial Bus (USB) drive, SmartMedia card, MultiMedia card, MicroDrive™ device, CompactFlash™ device, MemoryStick device, SecureDigital card, optical data storage device, or the like As shown in FIG. 2, an executable data script file 217 is resident within removable data storage device 216. In embodiments of the present invention, executable data script file 217 is used for loading data onto portable electronic device 200, or for extracting data from portable electronic device 200. Alternatively, removable data storage device 216 may be communicatively coupled with communication interface 215 via a wired link.

In embodiments of the present invention, removable data storage device 216 may be used to convey script file 217 to portable electronic device 200. For example, a user may want to download data (e.g., music files, image files, data files, media files, configuration settings, etc.) onto portable electronic device 200, but portable electronic device 200 does not have the communication capacity (e.g., via wireless communications component 209) to receive that data in a satisfactory manner. In another embodiment, when portable electronic device 200 comprises position determining component 212, a user may load an almanac on each position reporting device which helps GNSS receiver 213 determine where GNSS satellites are in their respective orbits.

Alternatively, portable electronic device 200 may have the capacity to receive the data, but it may be too expensive to use the communications bandwidth in that manner. In another embodiment, alpha-numeric input device 207 may limit the ability of a user to manipulate data and/or configuration settings of portable electronic device 200 in a satisfactory manner. However, using an embodiment of the present invention, the user can communicatively couple removable data storage device 216 with communication interface 215 and portable electronic device 200 will recognize and execute script file 217 which initiates downloading of the desired data onto portable electronic device 200.

Alternatively, the user may want to upload data (e.g., music files, image files, data files, media files, configuration settings, etc.) from portable electronic device 200, but finds it inconvenient or undesirable as described above. In one embodiment, when portable electronic device 200 comprises position determining component 212, a user can upload logged GNSS positioning data including, but not limited to, unprocessed signal data from each GNSS satellite in view of portable electronic device 200. Thus, the user can communicatively couple removable data storage device 216 with communication interface 215 and portable electronic device 200 will recognize and execute script file 217 which initiates uploading of the desired data onto portable electronic device 200.

As described above, in one embodiment, removable data storage device 216 comprises a USB data storage device. In one embodiment, portable electronic device 200 and removable data storage device 216 are compliant with the USB On-The-Go (USB OTG) specification. This allows portable electronic device 200 to act as a host device, or a peripheral device, depending upon its connectivity. Thus, USB On-The-Go permits portable electronic devices to exchange data without the necessity of coupling to a computer. In embodiments of the present invention, this permits portable electronic device 200 to act as a host device when removable data storage device 216 is coupled with it.

Figure 3:
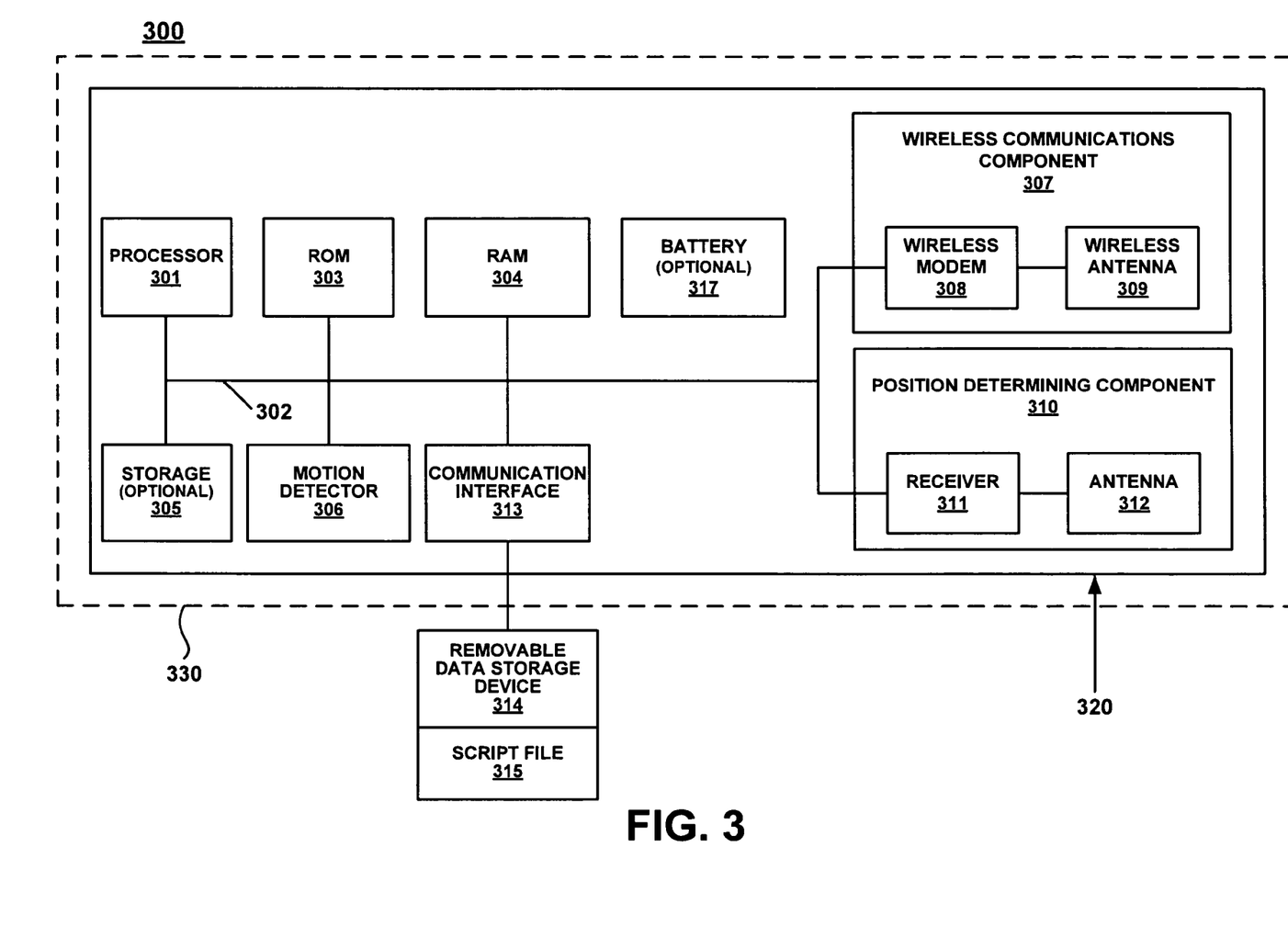
FIG. 3 is a block diagram of a position reporting device utilized in accordance with embodiments of the present invention.

FIG. 3 is a block diagram of a position reporting device 300 utilized in accordance with embodiments of the present invention. In FIG. 3, position reporting device 300 comprises a processor 301 coupled with an address/data bus 302. Processor 301 is for processing digital information and instructions and bus 302 is for conveying digital information between various components of position reporting device 300. Also coupled with bus 302 is a non-volatile read only memory (ROM) 303 for storing information and instructions of a more permanent nature, and a volatile random access memory (RAM) 304 for storing the digital information and instructions of a more volatile nature. In addition, position reporting device 300 may optionally include a data storage device 305 for storing vast amounts of data. In embodiments of the present invention, data storage device 305 may comprise a magnetic data storage device, or optical data storage device. It should be noted that instructions for processor 301 can be stored in non-volatile memory (ROM) 303, volatile memory (RAM) 304, or data storage device 305.

Position reporting device 300 further comprises a motion detector 306 coupled with bus 302 for detecting changes in the motion state of position reporting device 300. In embodiments of the present invention, motion detector 306 may comprise, but is not limited to, an accelerometer (including a multi-axis accelerometer), a compass, an inertial navigation device, a magnetometer, a tilt sensor, a rotation sensor, a gyroscope, or a combination thereof. In one embodiment, when motion detector 306 detects movement of position reporting device 300, it indicates this movement to processor 301.

Motion detector 306 detects when position reporting device 300 transitions from a substantially stationary state to a moving state. Motion detector 306 also can detect when position reporting device 300 transitions from a moving state to a substantially stationary state and/or changes in the rate of movement of position reporting device 300. In response to these changes in the motion state of position reporting device 300, processor 301 changes the operating state of position reporting device 300 from an idle operating state, in which few components of position reporting device 300 (e.g., wireless communications component 307 and GNSS position determining component 310) draw a minimal amount of power, to an active operating state in which these components draw additional power. Typically, position determining component 310 determines the geographic position of position reporting device 300. In one embodiment, position reporting device 300 generates a message to a third party, such as a tracking service, which indicates that position reporting device 300 has been moved and its current geographic position. In another embodiment, the geographic position of position reporting device, or the raw satellite data used to derive that position, is stored for later retrieval. In the embodiment of FIG. 3, an optional battery 317 is for providing power to position reporting device 300. It is noted that position reporting device 300 may be coupled with another power source such as an automotive electrical system or the power bus of an electrical device.

Returning to FIG. 3, position reporting device 300 further comprises a wireless communications component 307, comprising a wireless modem 308 and a wireless antenna 309, coupled with bus 302. A GNSS position determining component 310, comprising a GNSS receiver 311 and a GNSS antenna 312, is also coupled with bus 302.

Wireless communications component 307 is for transmitting and receiving wireless messages (e.g., data and/or commands). In one embodiment, wireless communications component 307 comprises a cellular wireless antenna 309 and a cellular wireless modem 308. In one embodiment, position reporting device 300 sends and receives message using the Short Message Service (SMS). However, position reporting device 300 is well suited to utilize other message formats as well. Alternatively, wireless communications component 307 may comprise a Bluetooth wireless communications device, or another wireless communications device such as a Wi-Fi transceiver. Wi-Fi transceivers are often used to create local are networks between a portable computer and an Internet access point in public areas such as airports, coffee shops, libraries, and the like.

GNSS position determining system 310 is for determining the location of position reporting device 300. In FIG. 3, position determining component 310 comprises a GNSS antenna 312 and a GNSS receiver 311. However, position reporting device 300 is not limited to using a GNSS position determining system alone. For example, position determining component 310 may determine the location of position reporting device 300 using cellular telephone signals, digital television signals, terrestrial-based navigation systems, etc In FIG. 3, position reporting device 300 further comprises a communication interface 313 which is coupled with bus 302. The above discussed components of position reporting device 300 may be disposed upon a printed circuit board 320 such as a Personal Computer Memory Card Industry Association (PCMCIA) card, or the like. This allows implementations of position reporting device 300 to be used in a variety of electronic devices such as cellular telephones, laptop computers, personal digital assistants (PDAs), automotive electrical systems, and the like. In another implementation, position reporting device 300 is a stand-alone device which is disposed within a housing 330. Thus, position reporting device 300 may be utilized by a dedicated portable motion-activated position reporting device.

Returning to FIG. 3, a removable data storage device 314 is communicatively coupled with interface 313. Removable data storage device 314 may comprise a removable storage medium such as a Smart Card, Universal Serial Bus (USB) drive, SmartMedia card, MultiMedia card, MicroDrive™ device, CompactFlash™ device, MemoryStick device, SecureDigital card, optical data storage device, or the like As shown in FIG. 3, an executable data script file 315 is resident within removable data storage device 314. In embodiments of the present invention, executable data script file 315 is used to initiate loading data onto position reporting device 100, or for extracting data from position reporting device 100. Alternatively, removable data storage device 314 may be communicatively coupled with communication interface 313 via a wired link.

In embodiments of the present invention, removable data storage device 314 may be used to convey script file 315 to position reporting device 300. For example, a user may want to download data (e.g., data files, configuration settings, etc.) onto position reporting device 300, but position reporting device 300 does not have the communication capacity (e.g., via wireless communications component 307) to receive that data in a satisfactory manner. Alternatively, position reporting device 300 may have the capacity to receive the data, but it may be too expensive to use the communications bandwidth in that manner.

As an example, a user may want to update the almanac on each position reporting device which helps GNSS receiver 311 determine where GNSS satellites are in their respective orbits. In fleet monitoring applications in which dozens, or hundreds, of position reporting devices (e.g., 300) are used to monitor assets, it can become problematic to update the almanacs of each position reporting device using a laptop computer due to the large numbers of position reporting devices used. In other words, it is difficult for a user to manually couple laptop computer to each position reporting device and download the desired data onto each device when dozens or hundreds of position reporting devices are in use. However, using an embodiment of the present invention, the user can communicatively couple removable data storage device 314 with communication interface 313 and position reporting device 300 will recognize and execute script file 315 which initiates downloading of the desired data onto position reporting device 300. Additionally, this can be performed quickly and without the necessity of carrying cumbersome equipment and coupling it to each position reporting device.

Alternatively, the user may want to upload data (e.g., data files, configuration settings, etc.) from position reporting device 300, but finds it inconvenient or undesirable as described above. For example, a user may want to download data which was logged by position reporting device 300. In embodiments of the present invention, the user can communicatively couple removable data storage device 314 with communication interface 313 and position reporting device 300 will recognize and execute script file 315 which initiates uploading of the desired data onto position reporting device 300. Again, embodiments of the present invention facilitate greater ease in downloading information from position reporting device 300

Figure 4:
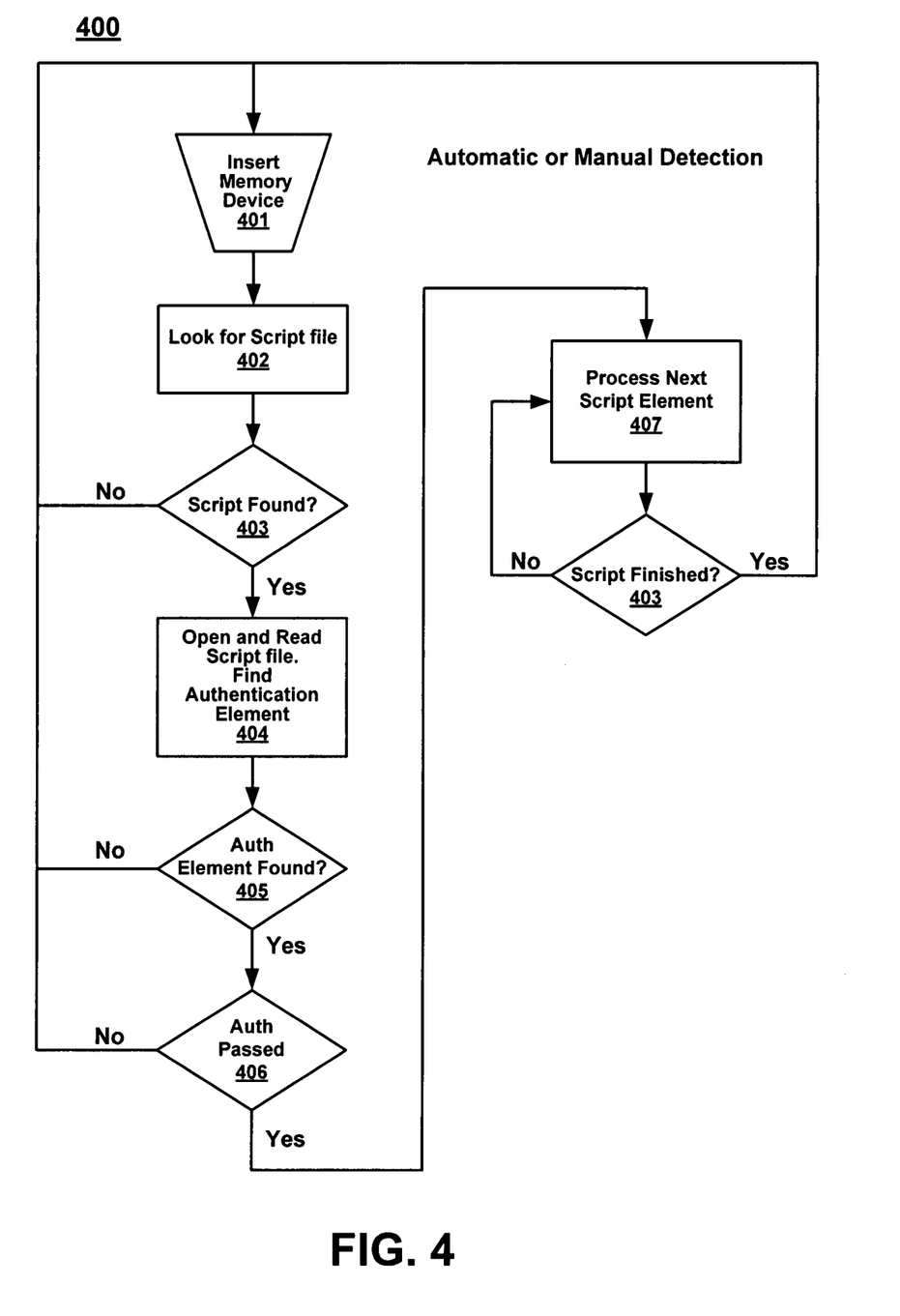
FIG. 4 is a flowchart of a method for provisioning a portable electronic device in accordance with embodiments of the present invention.

FIG. 4 is a flowchart of a method 400 for provisioning a portable electronic device in accordance with embodiments of the present invention. In step 401 of FIG. 4, a memory device (e.g., removable data storage device 216 of FIG. 2 or removable data storage device 314 of FIG. 3) is inserted into a portable electronic device (e.g., portable electronic device 200 of FIG. 2, or position reporting device 300 of FIG. 3). In one embodiment, the portable electronic device may comprise a position reporting device such as position reporting device 300 as described above.

In step 402, the portable electronic device searches the removable data storage device for a script file. In one embodiment, portable electronic device 200 searches removable data storage device 216 for script file 217. In another embodiment, position reporting device 300 searches removable data storage device 314 for script file 315.

In step 403, a logical operation is performed to determine whether the script file has been found. In one embodiment, if the script file (e.g., 217 or 315) is not found, method 400 returns to step 401. In one embodiment, if the script file is found (e.g., 217 or 315) is found, method 400 proceeds to step 404.

In step 404, the script file is read and an authentication element is located. In embodiments of the present invention, an authentication element is included in the script file which is verified by portable electronic device 200, or position reporting device 300, prior to executing script file 217 or 315.

In step 405, a logical operation is performed to determine whether the authentication element has been located. In one embodiment, if the authentication element is not found, method 400 returns to step 401. In one embodiment, if the authentication element is found, method 400 proceeds to step 406.

In step 406, a logical operation is performed to determine whether the authentication element has passed an authentication test. In embodiments of the present invention, the authentication element may comprise a unique sequence of characters. In one embodiment, the authentication element may be encrypted for greater security. In one embodiment, the authentication test may comprise a sequence of steps using a plurality of identification elements. In one embodiment, if the authentication element does not pass the authentication test, method 400 returns to step 401. In one embodiment, if the authentication element passes the authentication test, method 400 proceeds to step 407.

In step 407, a script element is processed. In embodiments of the present invention, the script element may be used to initiate downloading data onto portable electronic device 200 or position reporting device 300. In embodiments of the present invention, the script element may be used to initiate uploading data from portable electronic device 200 or position reporting device 300. In one embodiment, method 400 proceeds to step 408. As an example, script elements for a position reporting device (e.g., 300 of FIG. 3 above) may include, but are not limited to, uploading a configuration to position reporting device 300, uploading firmware to position reporting device 300, and uploading a GNSS satellite almanac to position reporting device 300. Additionally, script elements for position reporting device 300 may include, but are not limited to, downloading configuration data from position reporting device 300, downloading a GNSS satellite almanac from position reporting device 300, and downloading operation log data from position reporting device 300. It is noted that these script elements may be applicable to portable electronic device 200 as well. An example of a text based script element used in embodiments of the present invention is shown below:

Password: od34N7A

DownloadLog: \Logs\

UploadFW: \Firmware\FWVer2.rom

As shown above, an authentication element (e.g., password od34N7A) is included in order to verify that the script elements are intended for use by position reporting device 300. The next script element is a command to download an operation data log from position reporting device 300 to removable data storage device 314. Finally, the last script element is a command to upload a new firmware version onto position reporting device 300. It is noted that the above script elements may be applicable to portable electronic device 200 in embodiments of the present invention.

In step 408, a logical operation is performed to determine whether the script has finished executing. In one embodiment, if script file 217 or script file 315 has finished executing, method 400 returns to step 401. In one embodiment, if script file 217 or script file 315 has not finished executing, method 400 returns to step 407 and the next script element is processed by portable electronic device 200 or position reporting device 300.

Figure 5:
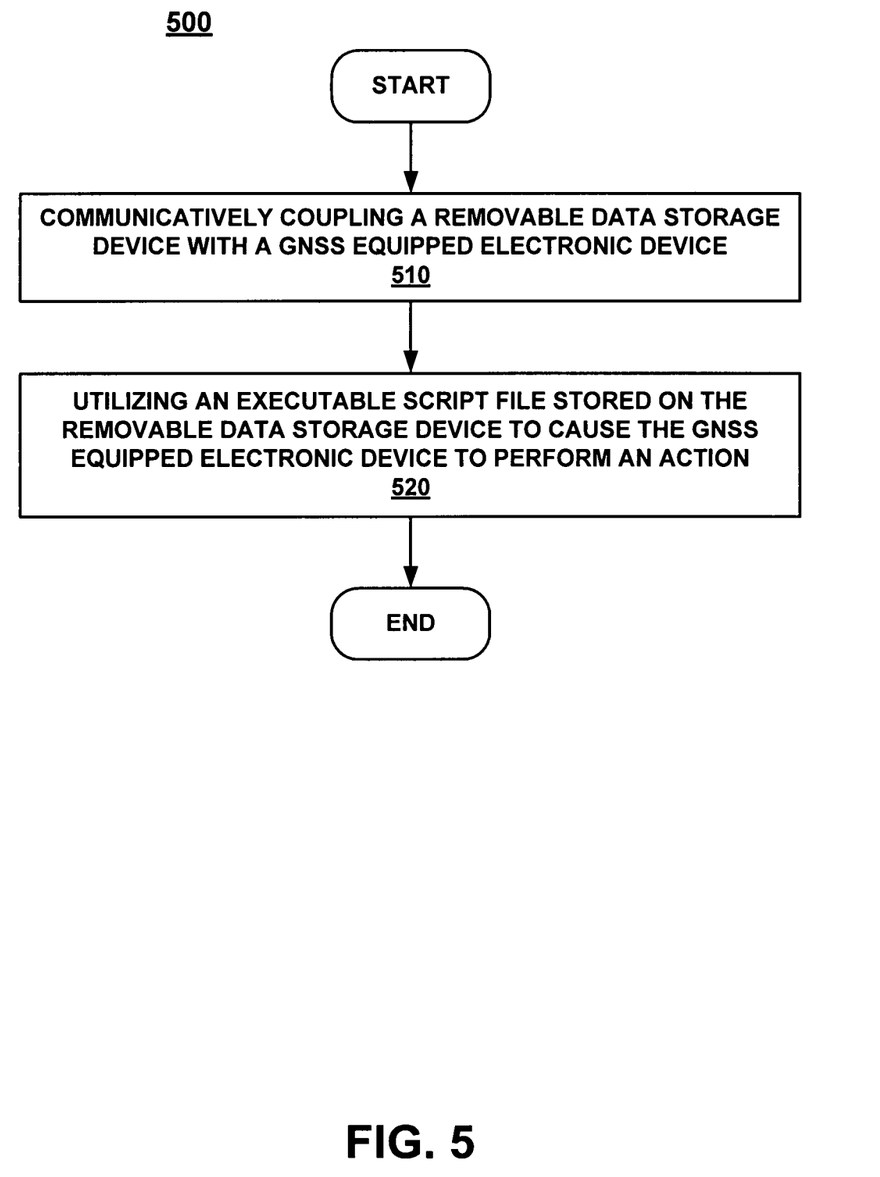
FIG. 5 is a flowchart of a method for provisioning a GNSS equipped electronic device in accordance with embodiments of the present invention.

FIG. 5 is a flowchart of a method 500 for provisioning a GNSS equipped electronic device in accordance with embodiments of the present invention. In step 510 of FIG. 5, a removable data storage device is communicatively coupled with a GNSS equipped electronic device. As described above with reference to FIGS. 2 and 3 removable data storage devices 216 and 314, of FIGS. 2 and 3 respectively, are communicatively coupled with GNSS equipped electronic devices 200 and 300 respectively in embodiments of the present invention.

In step 520 of FIG. 5, an executable script file stored on the removable data storage device is used to cause the GNSS equipped electronic device to perform an action. As described above, script file 217 of FIGS. 2 and 315 of FIG. 3 can be used to cause the GNSS equipped electronic device to perform an action. As discussed above with reference to FIG. 4, the script file can be used for uploading data files, configuration settings, firmware, etc. onto a GNSS equipped electronic device. Additionally, embodiments of the present invention can be used to download configuration settings, data logs, etc.

Figure 6:
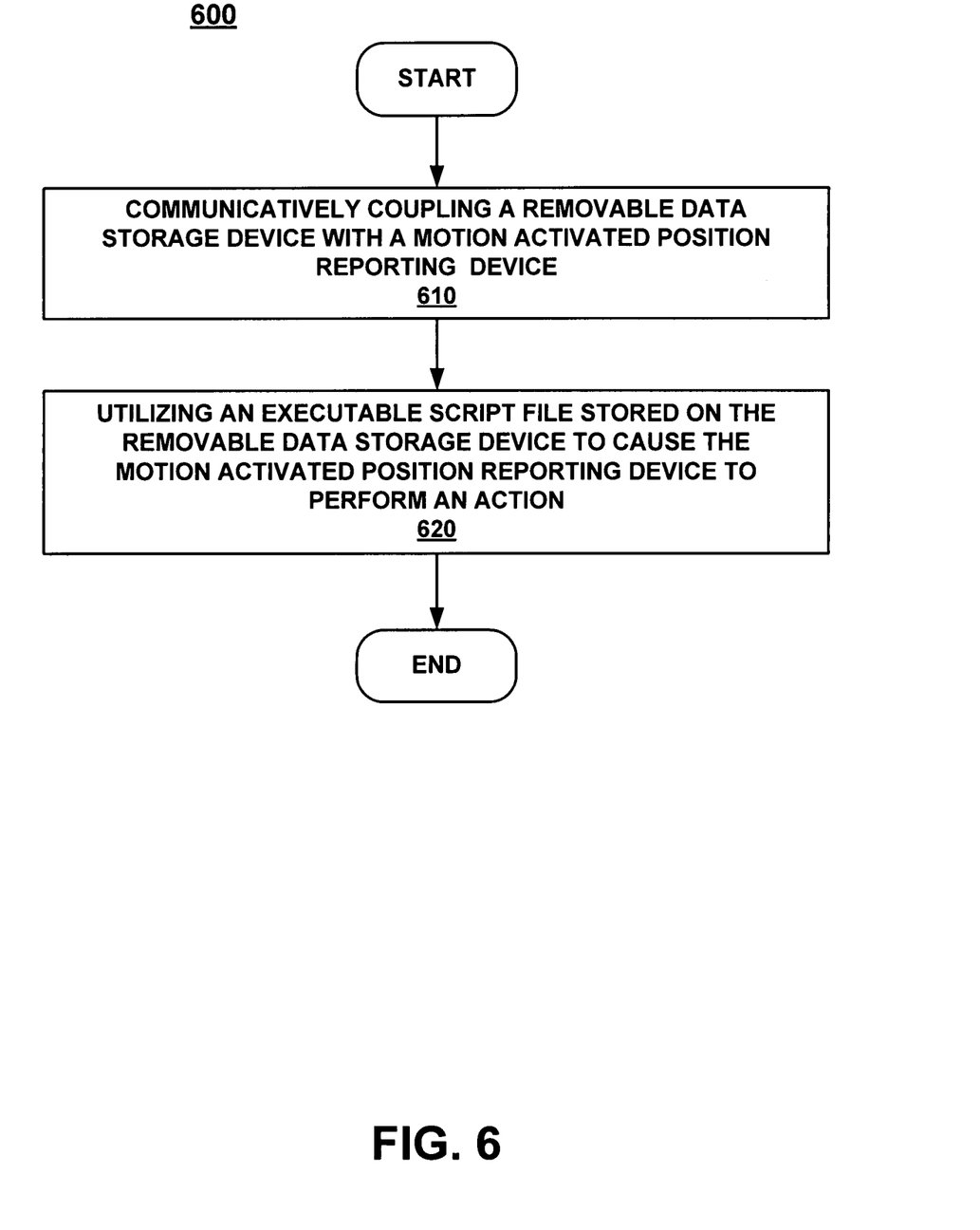
FIG. 6 is a flowchart of a method for provisioning a motion activated position reporting device in accordance with embodiments of the present invention.

FIG. 6 is a flowchart of a method 600 for provisioning a motion activated position reporting device in accordance with embodiments of the present invention. In step 610 of FIG. 6, a removable data storage device is communicatively coupled with a motion activated position reporting device. As described above with reference to FIG. 3, removable data storage device 314 is communicatively coupled with a motion activated position reporting device 300 via communication interface 315.

In step 620 of FIG. 6, an executable script file stored on the removable data storage device is utilized to cause the motion activated position reporting device to perform an action. As described above, script file 315 of FIG. 3 can be used to cause the motion activated position reporting device 300 to perform an action. As discussed above with reference to FIG. 4, the script file can be used for uploading data files, configuration settings, firmware, etc. onto a GNSS equipped electronic device. Additionally, embodiments of the present invention can be used to download configuration settings, data logs, etc.

The preferred embodiment of the present invention, utilizing scripting for provisioning actions, is thus described. While the present invention has been described in particular embodiments, it should be appreciated that the present invention should not be construed as limited by such embodiments, but rather construed according to the following claims.

What is claimed is:

1. A method for provisioning a portable electronic device, said method comprising:
    communicatively coupling a removable data storage device with said portable electronic device and wherein said portable electronic device comprises a motion-activated Global Navigation Satellite System (GNSS) receiver; and
    utilizing an executable script file stored on said removable data storage device to cause said portable electronic device to perform an action.

2. The method as recited in claim 1 further comprising:
    automatically initiating said script file when said removable portable data storage device is communicatively coupled with said portable electronic device.

3. The method as recited in claim 2 further comprising:
    said portable electronic device recognizing the insertion of said removable data storage device; and
    said portable electronic device automatically locating said executable script file in response to said recognizing.

4. The method as recited in claim 2 wherein said automatically initiating said script file further comprises:
    using an authentication element within said script file to verify said script file.

5. The method as recited in claim 1 wherein said portable electronic device comprises a Global Navigation Satellite System (GNSS) receiver.

6. The method as recited in claim 1 further comprising:
    selecting said executable script file from a group consisting of retrieving data from said portable electronic device and loading data onto said portable electronic device.

7. The method as recited in claim 1 further comprising:
    selecting said removable data storage device from the group consisting of a Smart Card, a Universal Serial Bus (USB) device, a SmartMedia card, a MultiMedia card, a MicroDrive device, a CompactFlash device, a MemoryStick, a SecureDigital card, and an optical data storage device.

8. A method for provisioning a Global Navigation Satellite System (GNSS) equipped electronic device, said method comprising:
    communicatively coupling a removable data storage device with said GNSS equipped electronic device and wherein said GNSS equipped electronic device comprises a motion-activated GNSS receiver; and
    utilizing an executable script file stored on said removable data storage device to cause said GNSS equipped electronic device to perform an action.

9. The method as recited in claim 8 further comprising:
    automatically initiating said script file when said removable portable data storage device is communicatively coupled with said portable electronic device.

10. The method as recited in claim 9 further comprising:
    said GNSS equipped electronic device recognizing the insertion of said removable data storage device; and
    said GNSS equipped electronic device automatically locating said executable script file in response to said recognizing.

11. The method as recited in claim 9 wherein said automatically initiating said script file further comprises:
    using an authentication element within said script file to verify said script file.

12. The method as recited in claim 7 further comprising:
    selecting said executable script file from a group consisting of retrieving data from said GNSS equipped electronic device and loading data onto said GNSS equipped electronic device.

13. The method as recited in claim 7 further comprising:
selecting said removable data storage device from the group consisting of a Smart Card, a Universal Serial Bus (USB) device, a SmartMedia card, a MultiMedia card, a MicroDrive device, a CompactFlash device, a MemoryStick, a SecureDigital card, and an optical data storage device.

14. A method for provisioning a motion activated position reporting device, said method comprising:
communicatively coupling a removable data storage device with said motion activated position reporting device; and
utilizing an executable script file stored on said removable data storage device to cause said motion activated position reporting device to perform an action.

15. The method as recited in claim 14 further comprising:
automatically initiating said script file when said removable portable data storage device is communicatively coupled with said motion activated position reporting device.

16. The method as recited in claim 15 further comprising:
said motion activated position reporting device recognizing the insertion of said removable data storage device; and
said motion activated position reporting device automatically locating said executable script file in response to said recognizing.

17. The method as recited in claim 15 wherein said automatically initiating said script file further comprises:
using an authentication element within said script file to verify said script file.

18. The method as recited in claim 14 further comprising:
selecting said removable data storage device from the group consisting of a Smart Card, a Universal Serial Bus (USB) device, a SmartMedia card, a MultiMedia card, a MicroDrive device, a CompactFlash device, a MemoryStick, a SecureDigital card, and an optical data storage device.

* * * * *